US011964177B2

(12) United States Patent
Oldham et al.

(10) Patent No.: US 11,964,177 B2
(45) **Date of Patent: *Apr. 23, 2024**

(54) INSTITUTIONAL SPRINKLERS AND INSTALLATION ASSEMBLIES

(71) Applicant: Minimax Viking Research & Development GmbH, Bad Oldesloe (DE)

(72) Inventors: Michael James Oldham, Kalamazoo, MI (US); Jonathan David Drake, Potsdam, NY (US)

(73) Assignee: Minimax Viking Research & Development GmbH, Bad Oldesloe (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/732,843

(22) Filed: Apr. 29, 2022

(65) Prior Publication Data

US 2022/0296948 A1 Sep. 22, 2022

Related U.S. Application Data

(63) Continuation of application No. 17/274,345, filed as application No. PCT/US2020/027491 on Apr. 9, 2020, now Pat. No. 11,344,758.

(60) Provisional application No. 62/859,487, filed on Jun. 10, 2019, provisional application No. 62/832,079, filed on Apr. 10, 2019.

(51) Int. Cl.

| | |
|---|---|
| ***A62C 37/12*** | (2006.01) |
| ***A62C 31/28*** | (2006.01) |
| ***B05B 15/16*** | (2018.01) |
| *B05B 3/04* | (2006.01) |

(52) U.S. Cl.
CPC .............. *A62C 37/12* (2013.01); *A62C 31/28* (2013.01); *B05B 15/16* (2018.02); *B05B 3/04* (2013.01)

(58) Field of Classification Search
CPC ......... A62C 31/02; A62C 31/28; A62C 37/11; A62C 37/12; A62C 37/14; A62C 37/16; A62C 37/20
USPC ........................................................... 169/37
See application file for complete search history.

(56) References Cited

U.S. PATENT DOCUMENTS

| | | | |
|---|---|---|---|
| 2,005,600 | A | 6/1935 | Tappen |
| 2,135,138 | A | 11/1938 | Kendall |
| 2,448,472 | A | 8/1948 | Schott |
| 2,732,018 | A | 1/1956 | Grimes |
| 3,768,736 | A | 10/1973 | Cox |
| 3,783,947 | A | 1/1974 | Dix et al. |
| 4,014,388 | A | 3/1977 | Anderson |
| 4,066,129 | A | 1/1978 | Anderson |
| 4,091,873 | A | 5/1978 | Werner |

(Continued)

OTHER PUBLICATIONS

International Searching Authority, International Search Report and Written Opinion in International AppIn. No. PCT/US2020/027491, dated Sep. 25, 2020, 26 pages.

*Primary Examiner* — Jason J Boeckmann
(74) *Attorney, Agent, or Firm* — Perkins Coie LLP

(57) ABSTRACT

Institutional sprinkler assemblies are provided that includes a sprinkler housing and protective cap arrangement to protect a thermally responsive shielding trigger. The sprinkler housing and trigger arrangement provide for an annular buffer to protect the trigger. The institutional sprinkler assemblies include configurations for installation in pendent and horizontal and orientations.

7 Claims, 10 Drawing Sheets

(56) References Cited

U.S. PATENT DOCUMENTS

| | | | | |
|---|---|---|---|---|
| 4,113,021 | A | 9/1978 | Werner | |
| 4,214,631 | A | 7/1980 | Hattori | |
| 4,580,729 | A | 4/1986 | Pounder | |
| 4,651,832 | A | 3/1987 | Kubo | |
| 4,880,063 | A | 11/1989 | Leininger et al. | |
| 5,372,203 | A | 12/1994 | Galaszewski | |
| 5,497,834 | A | 3/1996 | Onuki | |
| 5,727,737 | A | 3/1998 | Bosio et al. | |
| 5,865,256 | A | 2/1999 | Pounder | |
| 6,044,912 | A | 4/2000 | Tsuji et al. | |
| 6,123,153 | A | 9/2000 | Finnegan | |
| 6,129,153 | A | 10/2000 | Joung | |
| 6,336,509 | B1 | 1/2002 | Polan et al. | |
| 6,367,559 | B1 | 4/2002 | Winebrenner | |
| 6,374,919 | B1 | 4/2002 | Neill | |
| 6,840,329 | B2 | 1/2005 | Kikuchi et al. | |
| 6,854,668 | B2 | 2/2005 | Wancho et al. | |
| 7,137,455 | B2 | 11/2006 | Green | |
| 7,143,834 | B2 | 12/2006 | Dolan | |
| 7,222,678 | B2 * | 5/2007 | Shim | A62C 37/09 169/59 |
| 7,257,603 | B2 | 8/2007 | Murman et al. | |
| 7,275,603 | B2 | 10/2007 | Polan | |
| 7,353,882 | B2 | 4/2008 | Pahila | |
| 7,543,654 | B2 | 6/2009 | Koiwa | |
| 7,735,569 | B2 | 6/2010 | Green | |
| 7,921,928 | B2 | 4/2011 | Thompson et al. | |
| 8,151,897 | B1 | 4/2012 | Meyer et al. | |
| 8,176,987 | B2 | 5/2012 | Rekeny | |
| D663,009 | S | 7/2012 | Koiwa | |
| 8,353,356 | B2 | 1/2013 | Rogers | |
| 8,387,711 | B2 | 3/2013 | Cordell et al. | |
| 8,646,539 | B2 | 2/2014 | Abels et al. | |
| 8,662,190 | B2 | 3/2014 | Watson | |
| 8,662,191 | B2 | 3/2014 | Orr et al. | |
| 8,776,903 | B2 | 7/2014 | Jimenez et al. | |
| 9,027,660 | B2 | 5/2015 | Oldham | |
| 9,089,729 | B2 | 7/2015 | Almeida et al. | |
| 9,114,267 | B2 | 8/2015 | VanEerden et al. | |
| 9,132,305 | B2 | 9/2015 | Feenstra | |
| 9,320,929 | B2 | 4/2016 | Koiwa | |
| 9,339,675 | B2 | 5/2016 | Koiwa | |
| 9,265,981 | B2 | 9/2016 | Orr et al. | |
| 9,452,305 | B2 | 9/2016 | De Vries et al. | |
| 9,630,039 | B2 | 9/2017 | Koiwa | |
| 9,782,614 | B2 | 10/2017 | Chen | |
| 9,974,989 | B2 | 5/2018 | Abels et al. | |
| 2002/0056763 | A1 | 5/2002 | Winebrenner | |
| 2002/0129946 | A1 | 9/2002 | Retzloff et al. | |
| 2003/0079889 | A1 | 5/2003 | Meyer et al. | |
| 2006/0201286 | A1 | 9/2006 | Ide | |
| 2008/0257564 | A1 | 10/2008 | Cordell et al. | |
| 2009/0056958 | A1 | 3/2009 | Polan | |
| 2009/0218109 | A1 | 9/2009 | Sato | |
| 2009/0255693 | A1 | 10/2009 | Sato et al. | |
| 2009/0301742 | A1 | 12/2009 | Kammer | |
| 2010/0236797 | A1 | 9/2010 | Eerden et al. | |
| 2010/0263883 | A1 | 10/2010 | Abels et al. | |
| 2011/0315406 | A1 | 12/2011 | Connery et al. | |
| 2012/0261498 | A1 | 10/2012 | Kameishi et al. | |
| 2012/0267125 | A1 | 10/2012 | Abels et al. | |
| 2013/0284463 | A1 | 10/2013 | Multer et al. | |
| 2013/0341054 | A1 | 12/2013 | Polan et al. | |
| 2014/0076585 | A1 | 3/2014 | Abels et al. | |
| 2014/0216769 | A1 | 8/2014 | Almeida et al. | |
| 2015/0246252 | A1 | 9/2015 | Ancone et al. | |
| 2015/0343474 | A1 | 12/2015 | Connery et al. | |
| 2016/0121150 | A1 | 5/2016 | Penden et al. | |
| 2017/0319884 | A1 * | 11/2017 | Oldham | A62C 35/68 |
| 2019/0022442 | A1 | 1/2019 | Jimenez | |
| 2020/0101337 | A1 | 4/2020 | Shields | |
| 2021/0162249 | A1 | 6/2021 | Oldham | |

* cited by examiner

INSTITUTIONAL SPRINKLERS AND INSTALLATION ASSEMBLIES

PRIORITY CLAIM & INCORPORATION BY REFERENCE

This application is a continuation of U.S. patent application Ser. No. 17/274,375, filed Mar. 8, 2021, which is 35 U.S.C. § 371 application of International Application No. PCT/US2020/027491, filed Apr. 9, 2020, which claims the benefit of U.S. Provisional Application No. 62/832,079, filed Apr. 10, 2019, and U.S. Provisional Application No. 62/859,487, filed Jun. 10, 2019, each of which is incorporated by reference in its entirety.

TECHNICAL FIELD

The present invention relates generally to institutional sprinklers and in particular, flush mounted institutional sprinklers, their structure and installations.

BACKGROUND ART

Automatic sprinkler assemblies are well known and have long been used in fire extinguishing systems. Typically, automatic sprinkler assemblies include a sprinkler body which includes an inlet for connecting to a pressurized supply of water or other fire extinguishing fluid, an outlet opening, and a deflector to distribute a firefighting fluid to address a fire or wet the surrounding area. In automatic sprinklers, the outlet opening is normally closed in an unactuated state of the sprinkler by a closure seal held in place by a thermally responsive trigger. In response to a sufficient level of heat from a fire or other thermal event, the thermally responsive trigger operates or actuates to release the closure seal thereby permitting fluid to discharge from the outlet to impact the deflector for distribution. Automatic sprinklers can be configured for installation in pendent orientation mounted to a ceiling above a floor in which water is discharged to impact the deflector in a vertical direction from ceiling to floor. Automatic sprinklers can also be configured for installation in a horizontal orientation mounted to a sidewall between a ceiling and floor in which water is discharged to impact the deflector in a horizontal direction parallel to the floor.

One type of automatic sprinkler assembly is the “flush sprinkler.” According to the National Fire Protection Association (NFPA), a flush sprinkler is a sprinkler in which all or part of the body, including the shank thread of the thread, is mounted above the lower plane of the ceiling. In the case of a flush sidewall sprinkler, all or part of the body is mounted interiorly to the exterior wall surface of a wall. Typically, in flush sprinkler assemblies, the fluid distribution deflector is recessed within the housing in an unactuated state and movably mounted by a pair of guide members or pins to move to an extended position outside the housing spaced from the outlet. In some flush sprinkler assemblies, the fluid seal is secured by a trigger mechanism in the form of a fusible link. Upon thermal actuation, the fusible link separates to permit the pins and the deflector to move in an outward direction. Under the pressure of the firefighting fluid, the internal seal is pushed out of the outlet opening and the deflector moves to its outward position to distribute the fluid. Flush sprinkler assemblies can be configured for installation in either a pendent orientation or a horizontal orientation with the guide members sliding accordingly in either the vertical or horizontal direction.

One particular type of flush sprinkler is the institutional sprinkler. An “institutional sprinkler,” according to the National Fire Protection Association (NFPA), is a “sprinkler specially designed for resistance to load-bearing purposes and with components not readily converted for use as weapons.” Institutional sprinklers are typically used in medical or correctional facilities where there is a need to eliminate or minimize intentional tampering with the sprinkler. Generally, institutional sprinklers are compact with minimal access points into the sprinkler housing or the internal components.

For some institutional sprinklers, the thermally responsive fusible trigger is disposed at or proximate the end of the sprinkler housing to protect the internals of the sprinkler housing including the internal components. Examples of such sprinklers are shown and described in U.S. Patent Publication No. 2017/0319884 and U.S. Pat. No. 9,974,989. One problem with these known institutional sprinklers assemblies is that the periphery of the trigger remains radially exposed and therefor can be subject to tampering by radial impact. Moreover, because the periphery of the trigger is exposed, the trigger can be subjected to accidental impact and damage due to surrounding operations which can result in unintentional sprinkler operation. Prior to placing any sprinkler into service, e.g., during storage, transport or during system construction, the sprinkler can be dropped or impacted which results in damage to the trigger. Accordingly, for institutional sprinklers in which the periphery of the trigger is exposed prior to being placed into service, the institutional sprinkler is vulnerable to damage at any point prior to service. Protective devices or covers are available to shield the trigger during storage or shipment, but typically, these protective devices must be removed in order to engage the sprinkler with an installation tool. Thus, the sprinkler can be damaged by the installation process itself.

There remains a need for institutional sprinkler assemblies that protect the thermally responsive trigger to minimize exposure to intentional tampering. Moreover, institutional sprinkler assemblies are needed which can maximize protection of the thermally responsive trigger prior to placing the sprinkler in service particularly during the installation process.

DISCLOSURE OF INVENTION

Preferred embodiments of a sprinkler assembly are provided that include preferred embodiments of an institutional sprinkler assembly. One preferred embodiment of a protected institutional sprinkler assembly includes a sprinkler housing and protective cap arrangement in which a thermally responsive trigger of the sprinkler is protected between the housing and the cap prior to being placed into service including during the installation process. Moreover, the preferred embodiments of the protective cap provide for a manner of tool engagement. In one preferred embodiment, an institutional sprinkler assembly includes an elongate housing extending along a sprinkler axis having a first end portion with an inlet end face and a second end portion axially spaced apart from the first end portion having a terminal end face. The housing has an outer surface defining the external profile of the housing and an internal surface defining an internal conduit of the housing. The outer surface of the first end portion is configured for coupling to a fluid supply pipe and the outer surface of the second end portion includes a plurality of tool engagement channels. The assembly includes a thermally responsive actuator including a shielding trigger inserted into the internal conduit of the housing at the second end portion. A preferred protective cap is engaged with the second end portion of the housing to enclose the shielding trigger between the second end portion of the housing and the protective cap. The protective cap has a shielding base portion and an annular engagement portion formed about the shielding base portion with the annular engagement portion preferably defining a plurality of tool engagement ports. The protective cap is preferably oriented about the second end portion of the housing so that the tool engagement ports are aligned with the engagement channels for receipt of a tool member.

Other embodiments of the preferred institutional sprinkler provide for a housing and trigger assembly arrangement that includes an annular buffer to radially protect the thermally responsive trigger. In one preferred embodiment of an automatic institutional sprinkler having an actuated state and an unactuated state, the sprinkler includes an elongate housing having an inlet end surface, a terminal end surface, and an internal surface defining an internal conduit extending along a sprinkler axis between the inlet end surface and the terminal end surface. A discharge orifice is located between the inlet end surface and the terminal end surface and centered along the sprinkler axis. The internal surface of the housing defines an internal chamber formed along the internal conduit and axially located between the discharge orifice and the terminal end surface. The sprinkler includes a deflector assembly having a fluid deflection member with the deflector assembly locating the fluid deflection member in the internal chamber in the unactuated state of the sprinkler and locating the fluid deflection member outside of the internal conduit in the actuated state of the sprinkler. A seal assembly supported within the discharge orifice by the deflector assembly in the unactuated state of the sprinkler. A thermally responsive actuator of the assembly controls the unactuated and actuated state of the sprinkler with the thermally responsive actuator includes a shielding trigger having an insertion end, a thermal detection end and an annular wall extending axially between the insertion and thermal detection ends to define a total shielding trigger height. The insertion end of the shielding trigger in the unactuated state of the sprinkler is inserted into the internal conduit so that the thermal detection end of the shielding trigger is preferably at least axially aligned with the terminal end surface of the housing with the annular wall of the shielding trigger located within the internal conduit.

Additional embodiments provide for a preferred institutional sprinkler and fluid deflector assembly configured for installation in a horizontal sidewall installation above a floor plane. The preferred fluid deflector assembly includes a fluid deflector affixed to a pair of guide members or pins that are arranged in a plane that, upon sprinkler installation, is disposed perpendicular to the floor plane. One preferred embodiment of an automatic horizontal sidewall sprinkler is provided for installation in a horizontal orientation above a floor plane. The preferred sprinkler includes an elongate housing including a body having an inlet end, a terminal end and an internal conduit extending from the inlet end and the terminal end along a sprinkler axis. The internal conduit defines an internal discharge orifice located between the inlet end and the terminal end and an internal chamber proximate located between the internal discharge orifice and the terminal end. A fluid deflector assembly for sidewall installation including a pair of pin members and a fluid deflection member affixed to the pair of pin members with the pin members being aligned in a plane bisecting the deflection member. The pin members are coupled to the body to form a sliding engagement with the body to locate the deflector member within the internal chamber in an unactuated state of the sprinkler and locate the fluid deflection member outside of the housing in an actuated state of the sprinkler. A seal assembly is supported within the discharge orifice by the deflector assembly in the unactuated state of the sprinkler. A thermally responsive actuator is engaged with the housing to define the unactuated state and the actuated state of the sprinkler. The thermally responsive actuator preferably supports the fluid deflection member within the internal chamber in the unactuated state of the sprinkler. When the sprinkler is installed in a horizontal orientation, the pin members are preferably oriented with respect to one another so that the plane bisecting the fluid deflection member is disposed perpendicular to the floor plane.

In addition or alternatively to the preferred embodiments of an institutional sprinkler assembly, a preferred sprinkler assembly includes a thermally responsive trigger having visible indicia in the form of raised characters to covey information about the institutional sprinkler assembly and/or its performance. In one preferred embodiment of a sprinkler assembly, the assembly includes an elongate housing extending along a sprinkler axis having a first end portion with an inlet end face and a second end portion axially spaced apart from the first end portion having a terminal end face. The housing has an outer surface defining the external profile of the housing and an internal surface defining an internal conduit of the housing. A preferred thermally responsive actuator including a trigger is disposed at the terminal end face proximate the internal conduit of the housing at the second end portion. The trigger preferably includes visible indicia conveying information about the sprinkler. The preferred trigger includes an element having an external planar surface disposed perpendicular to the sprinkler axis with the visible indicia being defined by markings disposed along the planar surface of the element. Preferably, the markings are out of plane of the planar surface.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1:
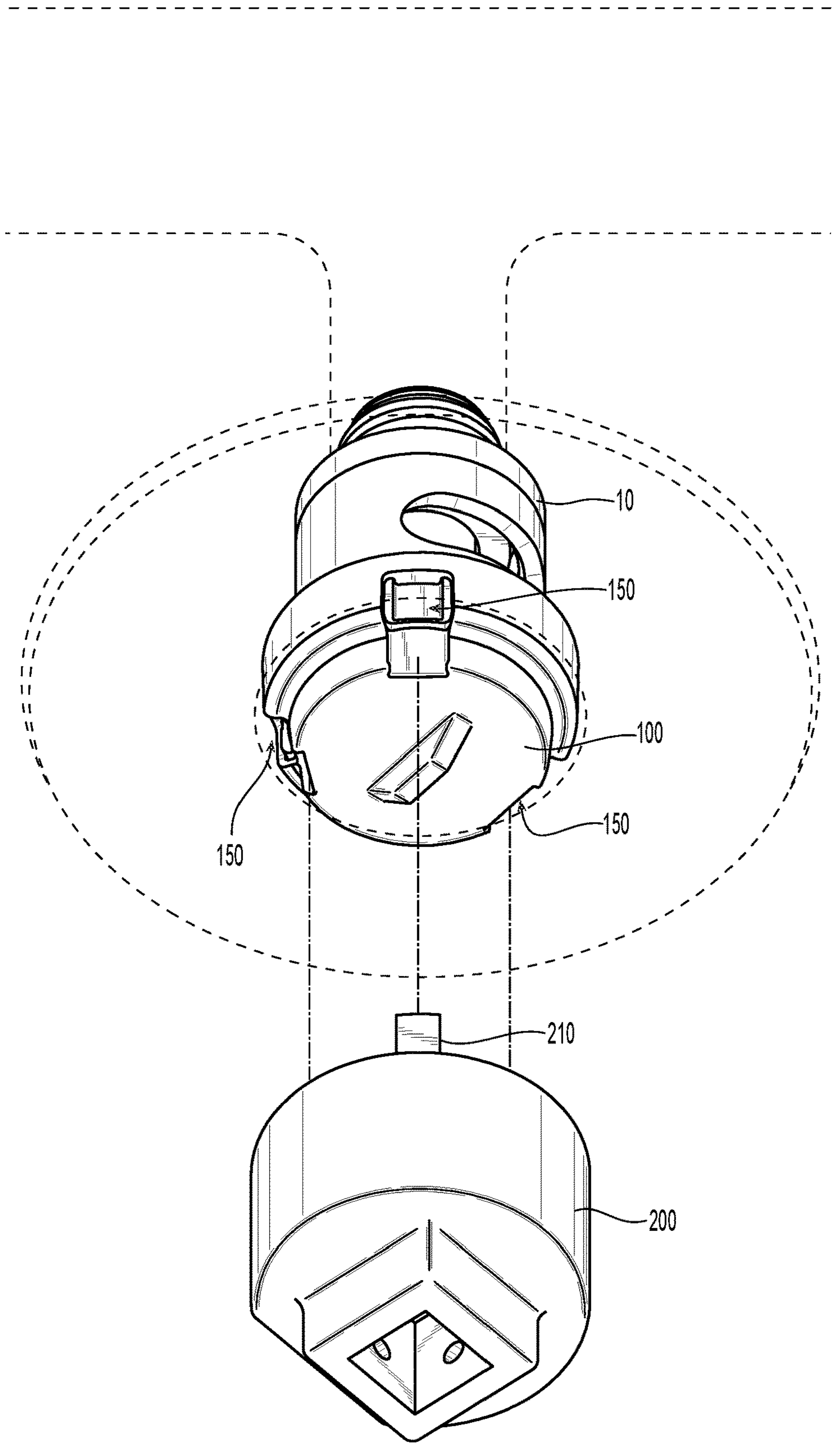
FIG. 1 is an exploded perspective schematic view of preferred embodiment of an installed protected institutional sprinkler and an installation tool.

FIG. 1 illustrates an installation of a preferred automatic institutional sprinkler assembly 10 and more preferably a flush institutional sprinkler assembly 10 described herein. As schematically shown, the sprinkler 10 is installed with its body above the lower plane of a ceiling and coupled to a fluid supply pipe located above the ceiling. Surrounding the sprinkler is an escutcheon (also shown in phantom) that mounts against the lower plane of the ceiling surface. One preferred embodiment of the institutional sprinkler assembly 10 incorporates a protective cap 100 that cooperates with a sprinkler housing to shield and protect operational components of the sprinkler assembly. In particular, the protective cap 100 engages the sprinkler assembly 10 so as to be selectively removable. The protective cap 100 can be disposed about the sprinkler assembly 10 and remain in place to protect the sprinkler assembly from accidental impact while held in storage, during transport, during installation into a fire protection system and when awaiting placement into system service. Accordingly, a preferred aspect of the protected sprinkler assembly 10 provides for an arrangement with the protective cap 100 that is configured to receive an installation tool 200 as illustrated in FIG. 1 to facilitate installation. As described herein, the sprinkler and protective cap arrangement provides an engagement keyway that accommodates the installation tool 200 such that the tool simultaneously rotates the protected arrangement when coupling the sprinkler assembly 10 to a fluid supply pipe (schematically shown).

Figure 2:
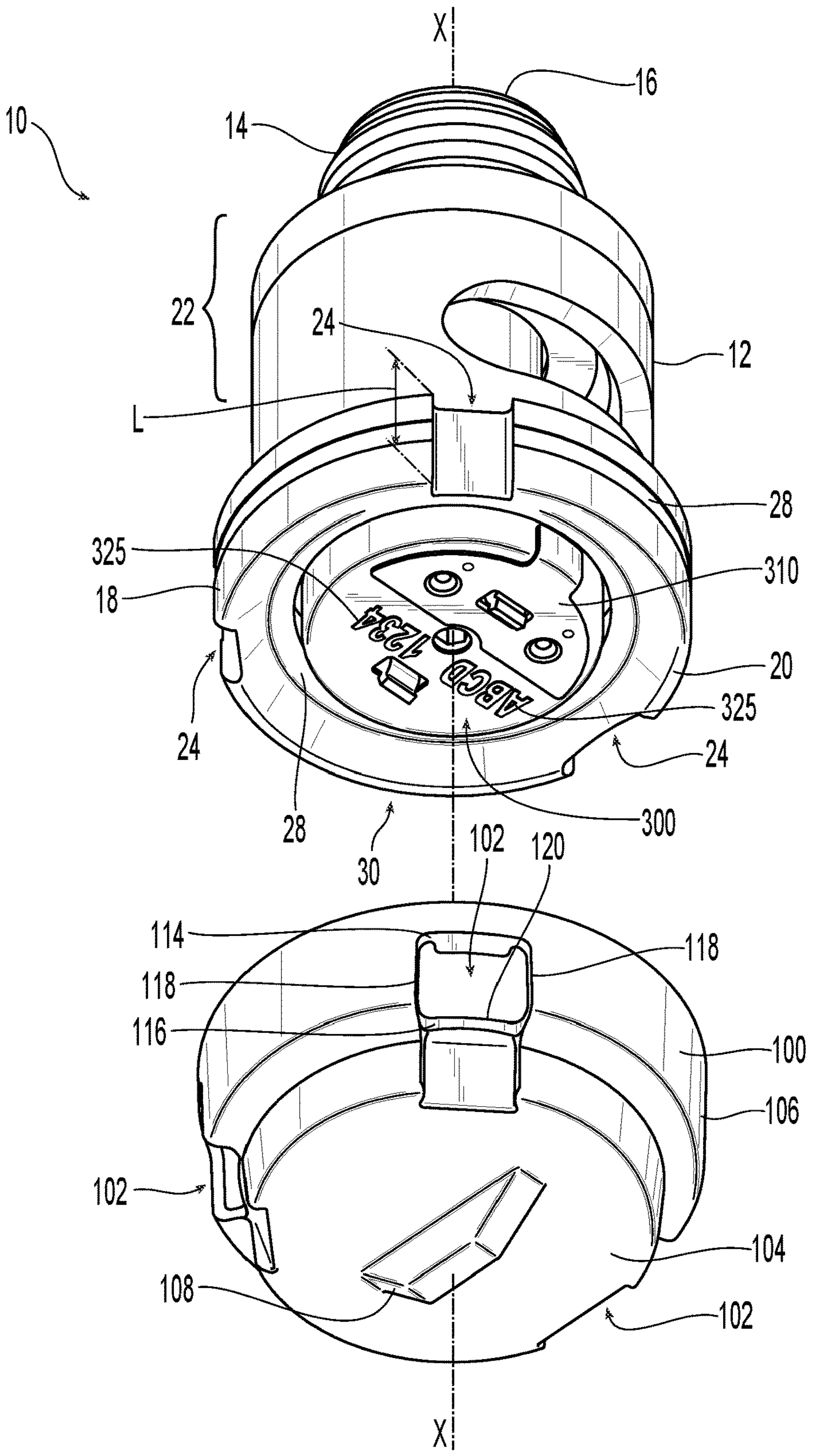
FIG. 2 is a perspective exploded view of the protected institutional sprinkler of FIG. 1.

With reference to FIG. 2, the preferred sprinkler assembly includes an elongate housing 12 extending along a sprinkler axis X-X having a first end portion 14 with an inlet end face 16 and a second end portion 18 having a terminal end face 20. The first end portion 14 and second end portion 18 are axially spaced apart from one another along the sprinkler axis X-X to define the axial length of the housing 12. The housing 12 has an outer surface 22 defining an external profile of the housing that facilitates sprinkler assembly and installation. The outer surface 22 of the first end portion 14 is configured for coupling the sprinkler 10 to a fluid supply pipe. The outer surface 22 proximate the inlet end face 16 preferably includes an external thread for coupling to a pipe fitting. The outer surface 22 at the first end portion 14 can be alternatively configured to provide for a different mechanical coupling, for example, a groove connection, snap fit or interference fit connection.

Figure 2A:
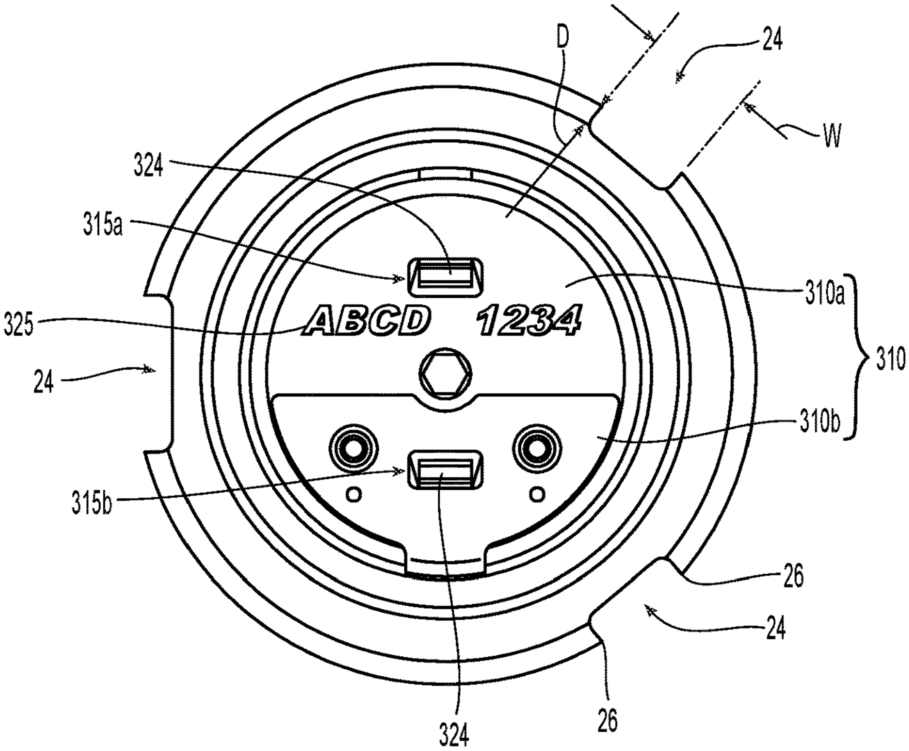
FIG. 2A is an end view of the institutional sprinkler in the protected institutional sprinkler of FIG. 2.

With reference to each of FIGS. 2 and 2A, the outer surface 22 at the second end portion 18 of the housing 12 includes two or more channels 24 for facilitating engagement with each of the protective cap 100 and the installation tool 200. The plurality of engagement channels 24 are angularly spaced and disposed about the housing 12 and the sprinkler axis X-X. Each of the engagement channels 24 is configured to receive the protective cap 100 and the installation tool 200 in a manner as described herein. Preferably, each channel 24 is formed proximate the terminal end face 20, extending axially between a pair of spaced apart sidewalls 26 that define the length L, depth D and width W of the channel 24.

The housing 12 also includes an internal surface extending from the inlet end face 16 to the terminal end face 20 to define an internal conduit 30 of the housing 12 for housing various operating components of the sprinkler assembly and defining a flow passage therethrough. As described herein, the sprinkler assembly 10 includes a thermally responsive actuator 300 having a preferred shielding trigger 310 disposed at the terminal end face 20 proximate the internal conduit 30 and more particularly inserted into the internal conduit 30 of the housing 12 at the second end portion 18. The shielding trigger 310 shields or obscures the internal conduit 30 thereby protecting components disposed therein. Additionally, preferred embodiments of the shielding trigger 310 convey information about the sprinkler 10, such as for example, manufacturing identifying information, sprinkler installation information and/or sprinkler performance information. In preferred embodiments, the shielding trigger 310 includes visible markings or indicia 325 to convey the desired information.

In the preferred protected assembly, the protective cap 100 is engaged with the second end portion 18 of the housing 12 to enclose the shielding trigger 310 between the second end portion 18 of the housing 12 and the protective cap 100. The preferred cap 100 includes one or more openings or ports 102 and more preferably two or more ports 102 for alignment with the channels 24 of the sprinkler housing 12. With the protective cap 100 engaged with the sprinkler housing 12 and aligned with the channels 24, the sprinkler is protected; and the assembly is prepared for receipt of the installation tool 200. With reference to FIGS. 1 and 2A, the alignment of the channel 24 and the ports 102 form a preferred keyway 150 in which to insert a projection member 210 of the installation tool 200. The inserted projection member 210 preferably rotationally interlocks the protective cap 100 and housing 12 to one another so that rotation of the installation tool 200 to thread the sprinkler assembly 10 into a fitting, for example, rotates the entire protected assembly 10.

The protective cap 100 is preferably cylindrical for coaxial alignment and engagement with the sprinkler housing 12. The contact between the housing 12 and protective cap 100 preferably forms a continuous annular protective buffer surrounding the shielding trigger 310. With reference again to FIG. 2, the preferred protective cap 100 includes a shielding base portion 104 and an annular engagement portion 106 formed about the shielding base portion 104. The shielding base portion 104 preferably presents a sufficient surface area to protect and cover the terminal end face 20 and the internal conduit 30. In the embodiment shown, the shielding base portion 104 is substantially circular and solid so as to completely prevent access to the shielding trigger 310 and the internal conduit 30 at the second end portion 18 of the sprinkler assembly 10. Alternatively, the shielding base portion 104 can be formed by a grid of members in a spaced apart formation sufficient to protect and cover the end portion 18 of the sprinkler assembly 10. Additionally, the shielding base portion 104 is substantially planar to minimize the profile but alternatively can be of any geometry, such as for example domed, so long as it protects the sprinkler assembly and facilitates sprinkler installation in a manner as described herein. The shielding base portion 104 also preferably includes a handle 108 that allow for an installer to grasp the protective cap 100 and dispose it over the second end portion 18 of the sprinkler assembly 10 or remove it from the housing 12 to expose the shielding trigger 310.

Figure 2B:
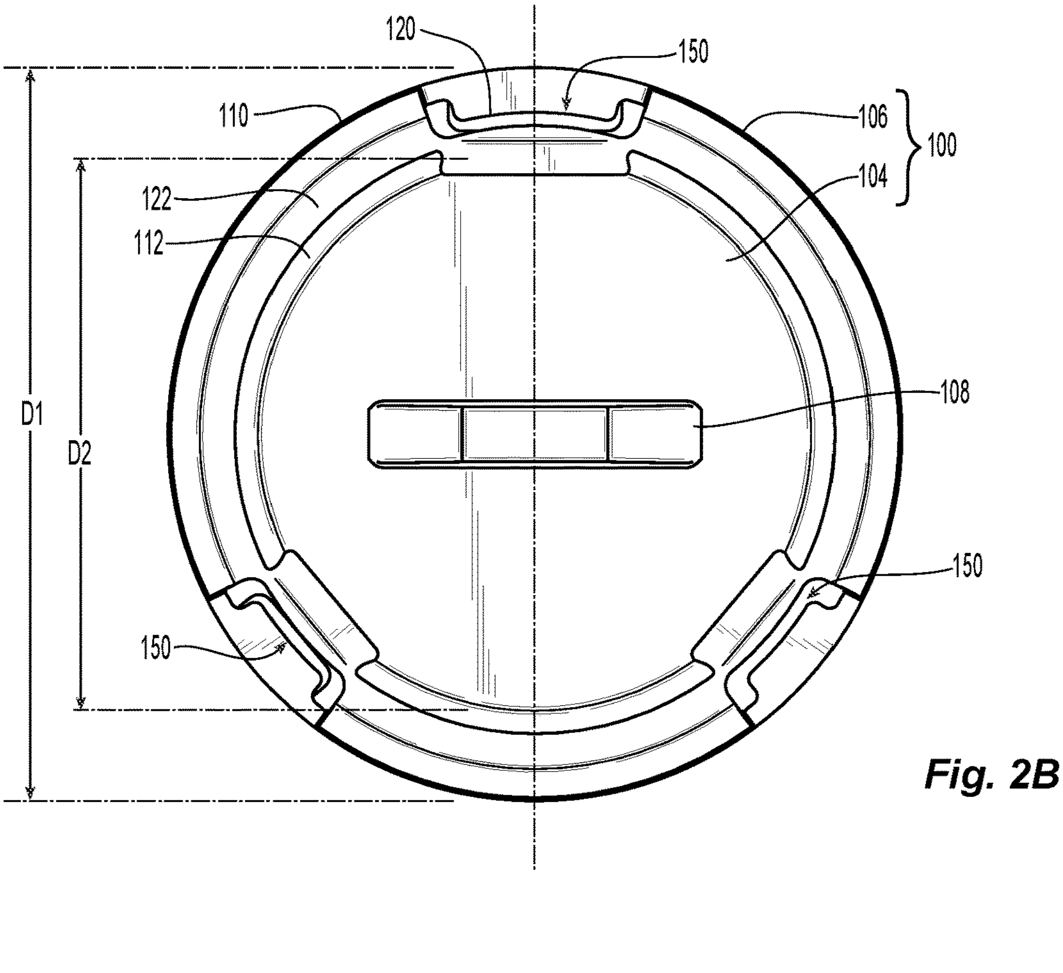
FIG. 2B is an end view of the protective cap used in the protected institutional sprinkler of FIG. 2.
Figure 2C:
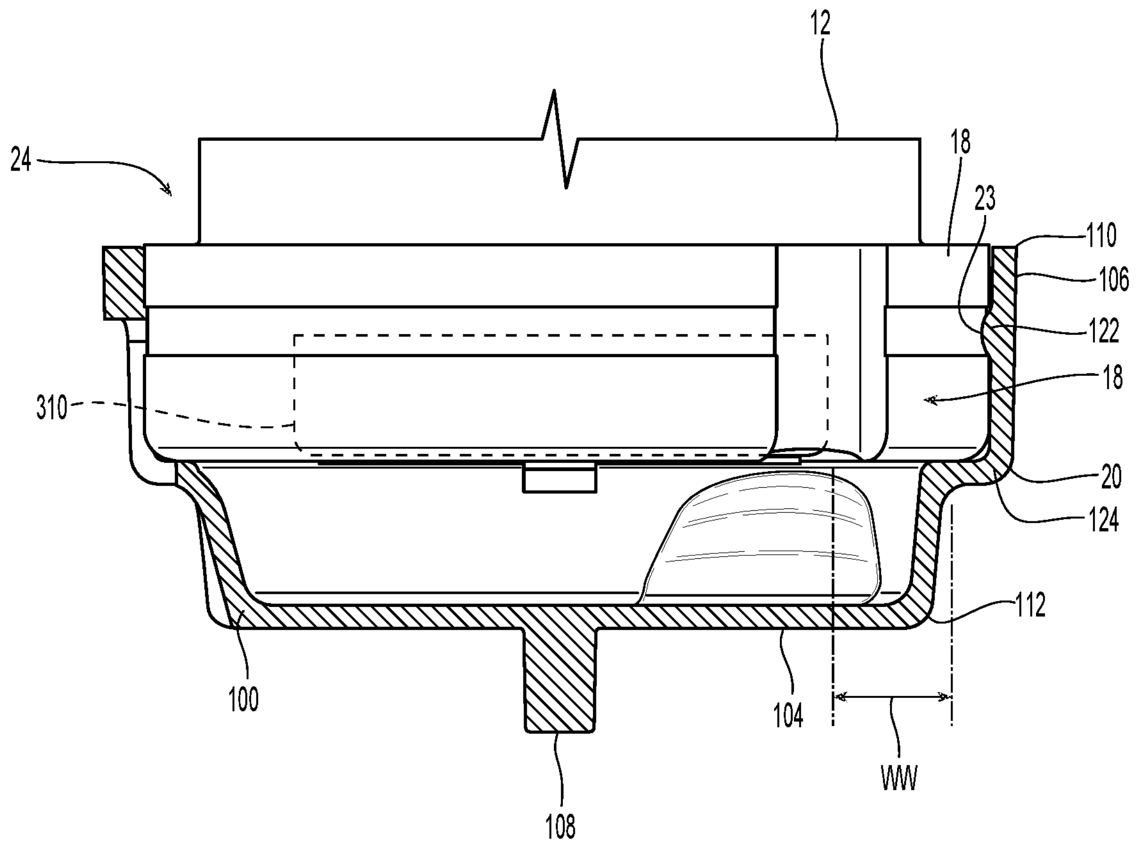
FIG. 2C is detailed partial cross-sectional view of the protected institutional sprinkler of FIG. 2.

With reference to FIGS. 2 and 2B-2C, formed about the shielding base portion 104 is the annular engagement portion 106 of the protective cap 100. The engagement portion 106 has a lead end 110 and a trailing end 112 axially spaced apart from one another to define an axial length of the annular engagement portion 106. The lead end 110 defines a first diameter D1 and the trailing end 112 being contiguous with the shielding portion defines a second diameter D2 that is preferably less than the first diameter D1. As seen in FIG. 2, the installation tool 300 preferably axially engages the protected sprinkler and cap assembly 10 and its keyways 150 in the axial direction. The difference in diameters D1, D2 provides for the axial access to the keyway 150 formed between the lead and trailing ends 110, 112.

The annular engagement portion 106 defines the preferred plurality of tool engagement ports 102 with two or more rectangular preferably closed formed openings or slots formed in the annular engagement portion 106 between the leading end 110 and the trailing end 112. With specific reference to FIG. 2, each closed form engagement port 102 has leading edge 114, a trailing edge 116 with sidewalls 118 extending between the leading and trailing edges 114, 116. Preferred embodiments of the protective cap 100 facilitates the engagement between the cap 100 and the sprinkler housing 12 and the alignment between the cap's engagement ports 102 and the housing channels 24. For example, as seen in FIGS. 2 and 2B the leading edge 114 preferably forms a radially extending tab 120 for engaging the engagement channels 24 of the housing 12. Depending upon the dimensions of the tab 120 and the corresponding channel 24, the engagement can define a preferred interference fit between the tab 120 and the sidewalls 26 of the channel 24. Moreover, by varying the dimensions of the tabs 120, the channels 24 and/or their respective angular spacings about their central axes, the individual keyways 150 can be uniquely dimensioned and/or located about the sprinkler axis X-X to define a rotational orientation to the protective cap 100 and tool 200 engagement that can facilitate an oriented installation such as, for example, a sidewall horizontal orientation, as described herein. Alternatively, or additionally, the internal surface of the cap 100 can include one or more projections 122, as seen in FIG. 2C, formed along an internal surface of the annular engagement portion 106 for a preferred snap-fit engagement with a preferred annular groove 23 formed along the exterior of the second end portion 18 of the housing 12. To limit the axial engagement between the protective cap 100 and the housing 12, the cap can include a stop or annular ledge 124 formed between the leading end 110 and the trailing end 112 to contact the terminal end face 20 of the housing and limit the axial engagement with the sprinkler housing 12.

The preferred engagement between the protective cap 100 and sprinkler housing 12 forms the preferred annular buffer to protect the shielding trigger 310 and internal conduit of the sprinkler assembly 10. Moreover, the preferred engagement maintains the cap 100 on the housing 12 during storage, transport and during system installation and service. Thus, the preferred protected sprinkler arrangement maximizes the protection of the sprinkler particularly during the system installation process when the sprinkler is most vulnerable to accidental impact from personnel or related equipment and tools used during mechanical construction and service operations. Once the sprinkler 10 is installed and ready to be placed into service, the protective cap 100 can be removed by pulling by the handle 108 thereby exposing the thermally responsive trigger assembly 300 and shielding trigger 310.

Generally, the preferred sprinkler assembly 10 has a compact profile that protects internal operating component of the sprinkler without protective cap 100. The sprinkler housing 12 and shielding trigger 310 define a preferred relationship in order to reduce sites along the sprinkler assembly that may be accidentally or intentionally impacted or tampered with, resulting in an undesired sprinkler operation or malfunction. Thus, as described herein, the preferred sprinkler assembly structure alone maximizes protection of its thermally responsive actuation assembly 300 during its installed and unactuated state in order to prevent inadvertent sprinkler operation form accidental impact resulting from operations in the surrounding environment.

Figure 3:
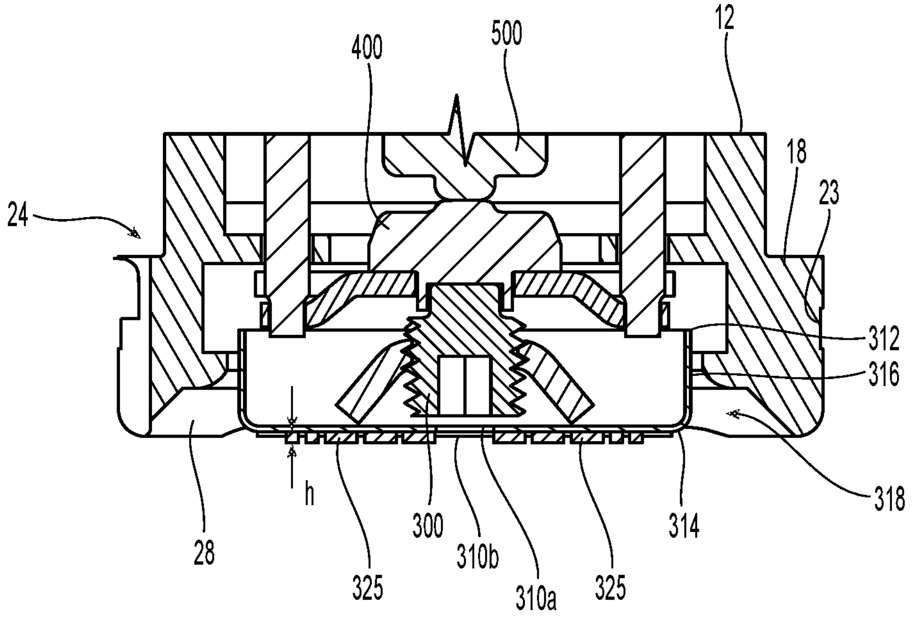
FIG. 3 is a detailed partial cross-sectional view of the institutional sprinkler of FIG. 2.
Figure 3A:
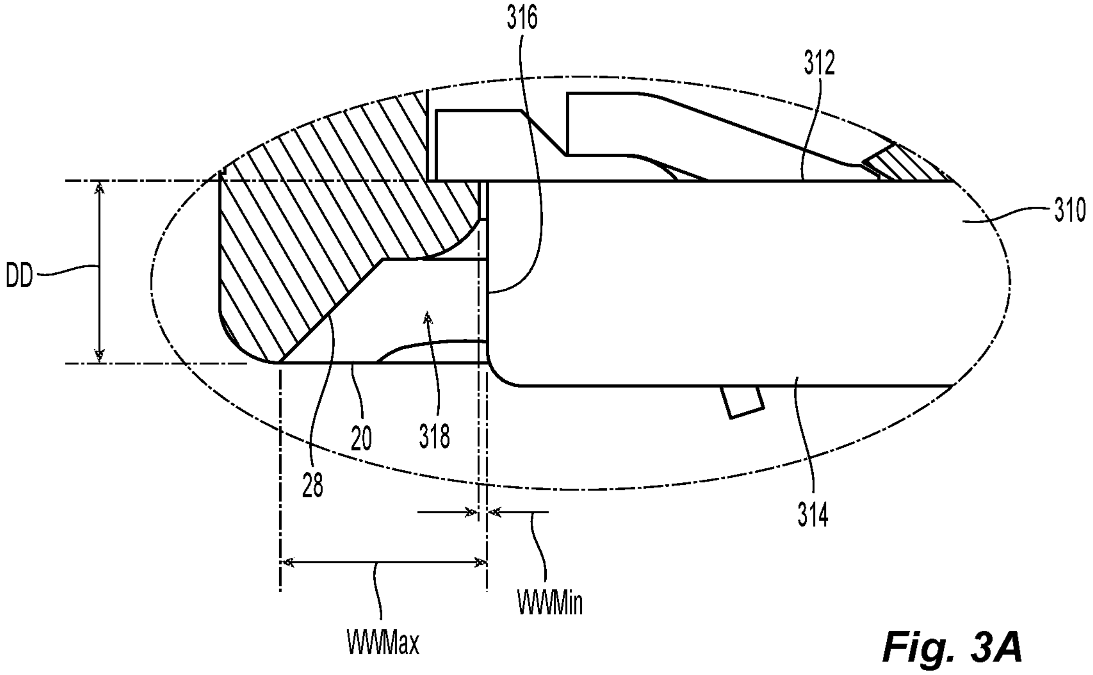
FIG. 3A is another detailed partial cross-sectional view of the institutional sprinkler of FIG. 2 orthogonal to the view of FIG. 3.

The shielding trigger 310 is preferably configured as the soldered assembly shown and described in U.S. Patent Publication No. 2017/0319884. With reference to FIGS. 3 and 3A, the preferred shielding trigger 310 has an insertion end 312, a soldered thermal detection end 314 and an annular wall 316 extending axially between the insertion and thermal detection ends 312, 314. The insertion end 312 of the shielding trigger 310 is inserted into the internal conduit 30 so that the shielding trigger 310 is engulfed by the second end portion 18 of the housing 12 such that a portion of the internal surface 28 at the second end portion of the housing 12 axially overlaps and radially surrounds at least a portion of the shielding trigger 310 to define an annular buffering air gap 318 between the shielding trigger 310 and the internal surface 28 of the housing 12. The annular buffering gap 318 preferably has a depth DD defined by the axial distance between the insertion end 312 of the shielding trigger 310 and the terminal end face 20 of the housing 12. The shielding trigger 310 is inserted into the internal conduit 30 to a preferred depth so that the thermal detection end 314 of the shielding trigger 310 is substantially axially aligned with the terminal end surface 20 of the housing 12. Alternatively, the shielding trigger 310 can be inserted into the internal conduit 30 to a depth so that the thermal detection end 314 is located inside the internal conduit 30. Accordingly, depending upon the extent to which the shielding trigger 310 is inserted into the internal conduit 30, the amount of internal surface 28 axial overlapping the trigger 310 can define a preferred ratio to total trigger length that ranges from 1:1 to 1.3:1.

With the shielding trigger 310 inserted in the internal conduit 30 so as to shield the internal conduit 30 from access, the internal surface 28 of the housing 12 surrounds the shielding trigger 310 to define the width WW, as indicated in FIGS. 2C and 3A, of the annular buffering air gap 318 defined by the radial distance between the shielding trigger 310 and the inner surface 28 of the housing 12. Preferably, the width WW varies over at least a portion of the annular buffering gap 318 with the maximum width WW being defined by the radial distance between the shielding trigger 310 and the terminal end face 20. Accordingly, where the annular wall 316 of the shielding trigger is parallel to the central sprinkler axis X-X, the inner surface 28 of the housing 12 preferably tapers away from the shielding trigger 310 in a direction toward the terminal end face 20, as seen for example in FIG. 3A. A preferred ratio of depth-to-maximum width (DD:WWMax) of the annular buffering gap ranges from 0.8:1 to 4:1. In the presence of fire or sufficient heat release event, the solder in the thermal detection end of the shielding trigger 310 fuses and the components of the trigger assembly separates to actuate the sprinkler 10. The preferred depth-to-maximum width (DD:WWMax) provides for the preferred annular buffering gap 318 that allows for sufficient thermal protection while at the same time sufficiently engulfing the shielding trigger 310 within the housing 12 for protection from accidental impact. Moreover, the shielding trigger 310 is engulfed by the housing 12 so as to provide a suitable institutional sprinkler in which the housing 12 and trigger 310 together shield the internal conduit 30 and protect the components of the sprinkler from load bearing purposes and intentional tampering or attempts to convert components of the sprinkler to weapons that would cause actuation of the sprinkler.

Figure 4A:
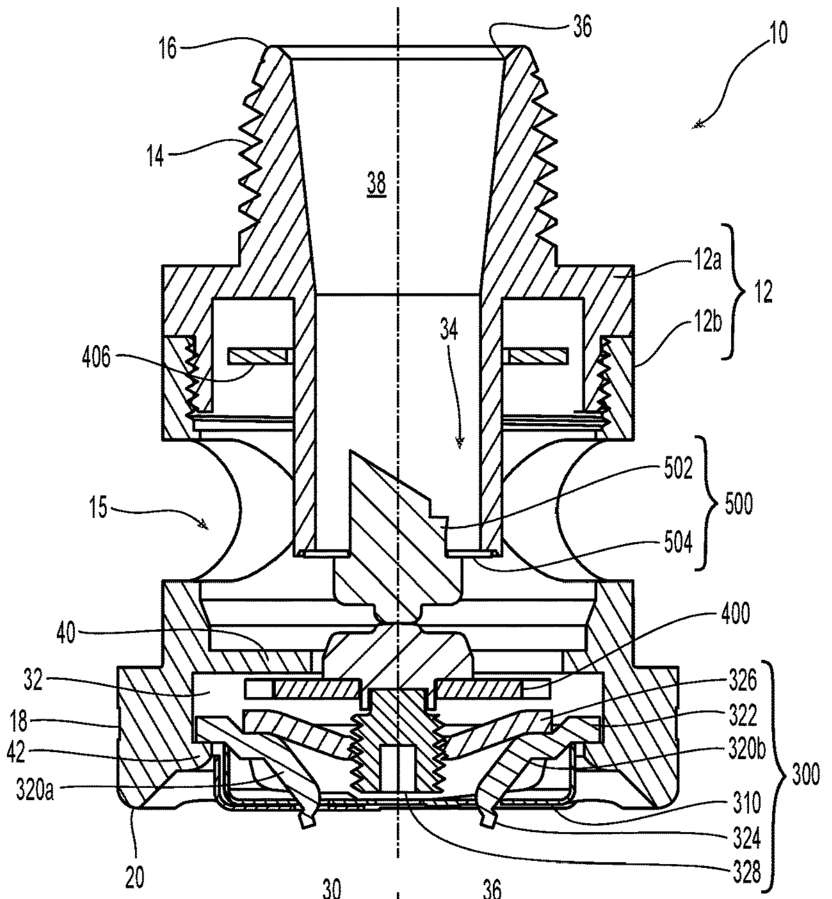
FIG. 4A is a cross-sectional view of the institutional sprinkler of FIG. 2.
Figure 4B:
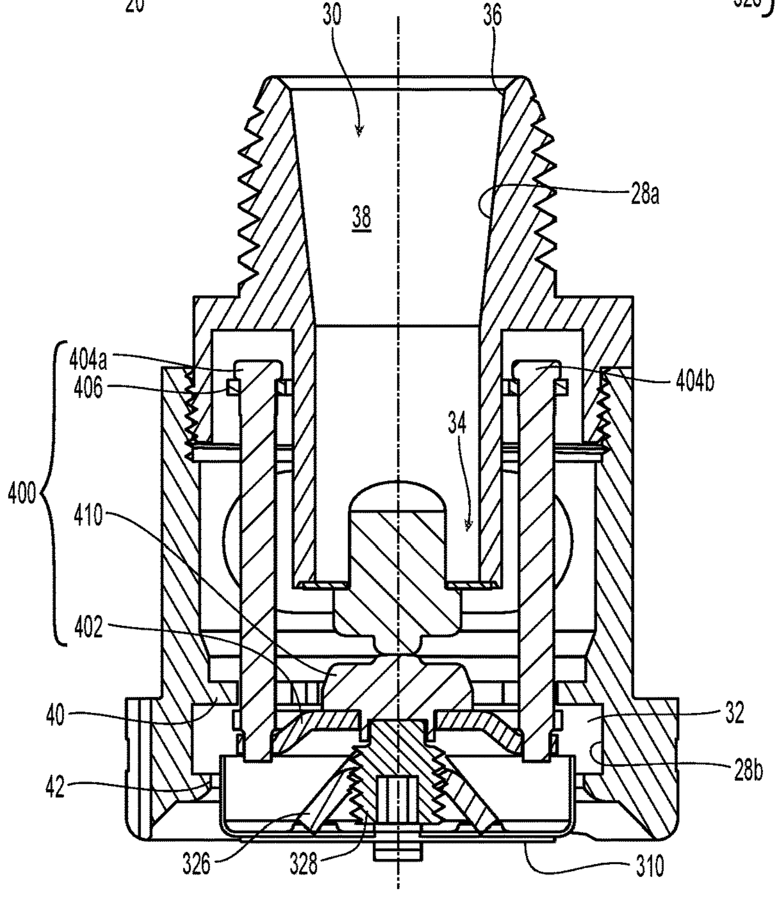
FIG. 4B is another cross-sectional view of the institutional sprinkler of FIG. 2 orthogonal to the view of FIG. 4A.

With respect to the cross-sectional views of the preferred institutional sprinkler 10 in FIGS. 4A and 4B, the sprinkler 10 includes a fluid deflector assembly 400 or portion thereof that translates preferably from a position within an internal chamber 32 of the internal conduit 30 in an unactuated state of the sprinkler assembly 10 to a position external the chamber 32 and the housing 12 in an actuated state of the sprinkler assembly 10. In the unactuated state of the sprinkler 10, the thermally responsive actuation assembly 300 supports the deflector assembly 400 within the internal chamber 32 so as to maintain or support the seal assembly 500 within an internal discharge orifice 34 of the housing 12 formed along the internal surface 28 and centered along the sprinkler axis X-X of the internal conduit 30 between the inlet end face 16 and terminal end face 20. The internal surface 28 defines a fluid inlet 36 proximate the inlet end face 16 and a flow passage 38 that extends from the fluid inlet 36 to the discharge orifice 34.

Formed at an axial distance from the discharge orifice 34 and between the discharge orifice 34 and the terminal end face 20 is the internal chamber 32. The internal surface 28 includes a first annular flange 40 and a second annular flange 42, each circumscribing the sprinkler axis X-X and coaxially spaced apart from one another to form the internal chamber 32 in between one another. In the unactuated state of the sprinkler assembly 10 with the shielding trigger 310 inserted in the internal conduit 30, the second annular flange 42 preferably radially surrounds the insertion end 312 of the shielding trigger 310 to define a minimum width WWMin of the annular buffering gap 318 as seen in FIG. 3A.

The housing 12 can be formed as a single integrated component or alternatively be formed from multiple components. In the preferred embodiment shown in FIGS. 4A-4B, the housing 12 includes a first component 12*a* and a second component 12*b* coupled to one another by a preferred threaded engagement. The first component 12*a* is a preferred body forming the first end portion 14 having a first internal surface 28*a* defining the fluid inlet 36 and the fluid discharge orifice 34 with the fluid flow passageway portion 38 extending between the fluid inlet 36 and the fluid discharge orifice 34. The second component 12*b* of the housing 12 forms the second end portion 18 and includes a second internal surface 28*b* that defines the internal chamber 32 axially spaced from the discharge orifice 34 for housing the fluid deflection assembly 400 or portions thereof such as, for example, the fluid deflection member 402. To facilitate flow of heat through the sprinkler 10 and thermal exposure of the actuator 300 to maximize thermal responsiveness, the second component 12*b* preferably includes one or more openings 15 providing heat flow access to the internal conduit 30.

To control the thermal operation of the sprinkler assembly 10, the thermally responsive actuation assembly 300 forms a surface contact engagement with the internal surface of the sprinkler housing 12 to provide the support to the deflector assembly 400 and the seal assembly 500 in their respective unactuated positions within the sprinkler housing 12. The thermally responsive actuator 300 includes a first lever member 320*a* and a second lever member 320*b* each having a first end 322 and a second end 324. In the unactuated state of the sprinkler, the first ends 322 of the lever members 320*a*, 320*b* are in surface contact with the second annular flange 42 and diametrically opposed from one another about the internal conduit 30. The second ends 324 of the lever members 320*a*, 320*b* are engaged with the shielding trigger 310 to support and preferably locate the shielding trigger 310 within the internal conduit 30 of the housing 12 as previously described. The first and second lever members 320*a*, 320*b* engage different soldered elements of the shielding trigger 310 at the thermal detection end 314. With reference to FIG. 2A, the soldered shielding trigger assembly 310 preferably includes a bottom element 310*a* and a top element 310*b* that are soldered together at the thermal detection end 314 to form the pair of apertures 315*a*, 315*b* for engagement by the respective second ends 324 of the lever members 320*a*, 320*b*.

In preferred embodiments of the shielding trigger 310, either one or both of the bottom element 310*a* and the top element 310*b* can be formed or stamped to provide a desired indicia 325 that can serve to inform, for example, to visually indicate sprinkler product or performance information. More particularly, the elements 310*a*, 310*b* can include markings, that are raised, embossed, or made in relief, to form letters, numbers, symbols or a combination thereof to provide the desired indicia 325 as illustratively shown in FIGS. 2, 2A and 3. Preferred embodiments of the trigger elements 310*a*, 310*b* include substantially planar external surfaces that are disposed perpendicular to the sprinkler axis X-X and visible in the sprinkler assembly 10. To provide the visible indicia 325, the markings are preferably disposed along the external planar surface(s) of the elements 310*a*, 310*b*. The preferred markings project from the trigger element 310*a*, 310*b* so as to be out of plane of the planar surface of the element(s). As seen in FIG. 3, the indicia 325 projects out of plane of the external surface of the first element 310*a* to a height h that is sufficient to provide a visible contrast. Alternatively, the indicia 325 can be defined by recessed markings so as to be indented at a depth with respect to the planar surface of the element 310*a* to provide the visible contrast. Although the indicia 325 is shown incorporated in the preferred institutional assembly 10 with the shielding trigger 310 inserted into and protected by the housing 12, it should be understood that the preferred markings can be incorporated into other types of sprinkler and trigger arrangements provided the trigger includes a sufficient surface in which to form the desired indicia. For example, a trigger with raised markings on its planar surface can be disposed at the terminal end face of the sprinkler housing proximate the internal conduit so as to make the indicia visible.

Referring again to FIGS. 4A and 4B and the cross-sectional views of the preferred sprinkler 10, the thermally responsive actuator 300 further includes a lever bar member 326 supported across the first and second lever members 320*a*, 320*b* and a load screw 328 in threaded engagement with the lever bar 326 to generate a sealing force against the deflector assembly 400 and preferably support the deflector assembly and the fluid deflection member or portions thereof within the internal chamber 32 of the housing 12. The deflector assembly 400 transfers the sealing force to the seal assembly 500 for sealed engagement within the discharge orifice 34. The seal assembly 500 preferably includes a closure device 502 having a spring plate 504 disposed about a seat of the closure device. Under the sealing force of the load screw 328 applied through the deflector assembly 400, the spring plate 504 forms a fluid tight seal against a seating surface formed at the discharge orifice 34. The spring plate 504 preferably biases the seal assembly 500 away from the orifice to facilitate ejection of the closure device 502 out the sprinkler housing upon thermal actuation.

As previously described, the solder of the shielding trigger 310 fuses in the presence of a sufficient level of heat. Upon proper solder fusion, the shielding trigger 310 collapses and the elements 310*a*, 310*b* separate from one another to take the lever members out of surface contact engagement with the second annular flange 42 of the housing 12. Without the support of the actuation assembly 300 in place, the fluid deflection assembly 400 translates out of the internal chamber 32 and the sealing assembly 500 eject free from the discharge orifice 34 under the force of the firefighting fluid which discharges out of the orifice 34 to impact the fluid deflection assembly 400 and address the fire or thermal event below the sprinkler.

Figure 5A:
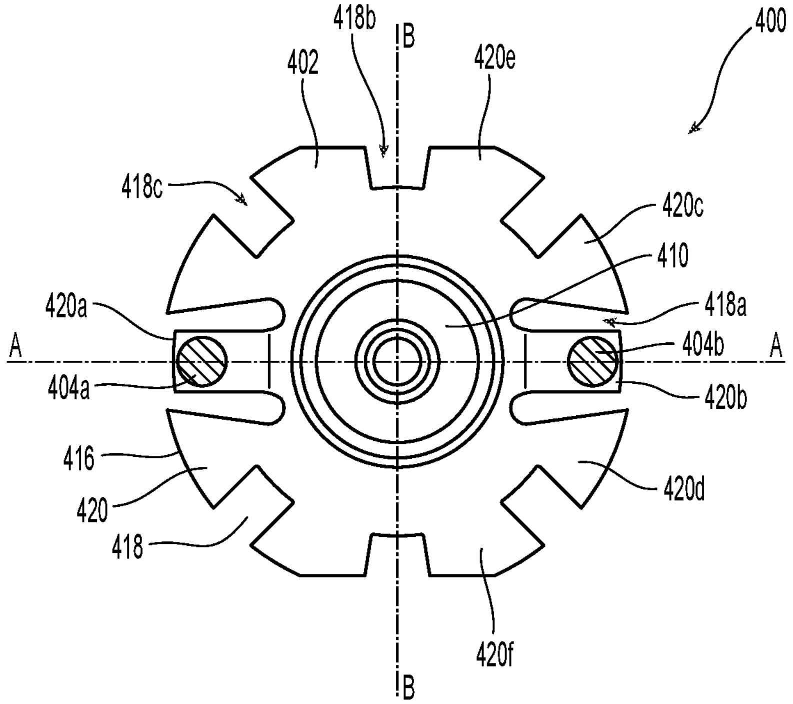
FIG. 5A is a plan view of a preferred fluid deflector assembly for use in the institutional sprinkler of FIG. 2.
Figure 5B:
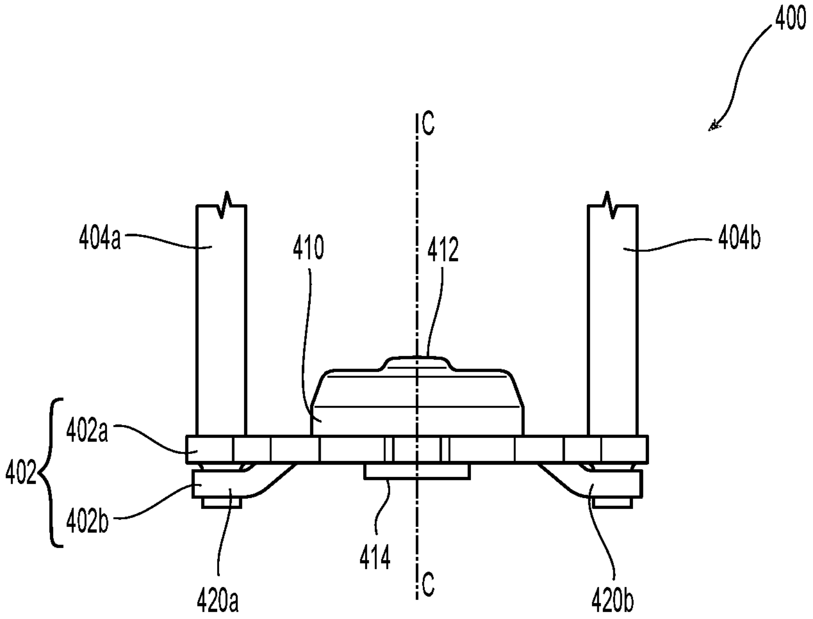
FIG. 5B is a side view of the preferred fluid deflector assembly of FIG. 5A.

With reference to FIGS. 4B and 5A-5B, the deflector assembly 400 used in the sprinkler assembly 10 includes a fluid deflection member 402 that is fabricated and formed to distribute and deflect firefighting fluid in a manner to effectively address a fire and/or wet a surrounding area. The deflector assembly 400 includes a pair of pin members 404*a*, 404*b* diametrically opposed from one another about the discharge orifice 34 and affixed to the fluid deflection member 402 for axial translation of the fluid deflection member 402. The pin members 404*a*, 404*b* are in a preferred sliding engagement with the housing 12 to preferably locate the fluid deflection member 402 within the internal chamber 32 in the unactuated state of the sprinkler and locate the fluid deflection member 402 outside of the housing in the actuated state of the sprinkler. More preferably, the pin members 404*a*, 404*b* are in a preferred sliding engagement with the first annular flange 40 to locate the fluid deflection member 402 in each of the unactuated and actuated states of the sprinkler 10. To support and align the pin members 404*a*, 404*b* the deflector assembly 400 can include an alignment ring 406 disposed within the housing 12 and which preferably circumscribes and slides about the flow passage 38. A projection button 410 is preferably centrally secured to an upstream side of the fluid deflection member 402. The button 410 includes an impact end 412 that confronts the discharge orifice 34 and an opposite end 414 that is configured to engage a preferred central hole formed in the fluid deflection member 402. The button 410 includes a generally cylindrical sidewall that is centered about the sprinkler axis X-X.

Generally, a preferred fluid pendent deflection member 402 is preferably oblong and can be symmetrical with respect to either the major axis A-A, the minor axis B-B, or both, which are perpendicular and intersect one another to define the central deflector axis C-C. The preferred fluid deflection member 402 has a perimeter defined by a plurality of spaced apart peripheral edges 416 with slots 418 formed between the spaced apart edges 416. The slot formation 418 and spaced apart edges 416 together define various tines 420. One or more of the peripheral edges 416 can be curvilinear with a radius of curvature defined by a center aligned with the deflector central axis C-C. Additionally, one or more of the peripheral edges 416 are linear extending parallel to one of the major or minor axes A-A, B-B. The slots 418 of the deflection member 402 can have different configurations. For example, the slots 418 can extend radially toward the central axis C-C or alternatively extend in a direction off-center. Some slots 418 can have a constant width over its length and other slots can have a variable slot width. The variable width slots 418 can narrow in the radial direction toward the central axis C-C or alternatively broaden in the direction toward the central axis C-C. The lengths of the slots can vary from slot to slot with each slot having an innermost radial portion that can be arcuate or alternatively be linear. Given the variation in the peripheral edges 416 and slots 418, the tines 420 can vary accordingly. Moreover, as seen in FIG. 5B, tines 420*a*, 420*b* of one configuration can be bent so as to be in a plane that is different than that of other tines 420 of a different configuration.

Preferred embodiments of the sprinkler 10 can be configured for installation in either a pendent orientation or a horizontal orientation. In the preferred fluid deflection member 402 of FIGS. 5A and 5B, the deflection member 402 is configured for use in a pendent-type deflector assembly 400. The fluid deflection member 402 is preferably oblong and symmetric with respect to each of the major axis A-A and minor axis B-B. The deflection member 402 is preferably oriented in the deflector assembly 400 so that the major axis A-A is aligned with the pin members 404*a*, 404*b*. The pin members 404*a*, 404*b* are preferably affixed to diametrically opposed tine members 420*a*, 420*b* which are preferably disposed below the remainder of the fluid deflection member 402 so as to define a second portion 402*b* of the deflector out of plane with a first portion 402*a*. The peripheral edge 416 of the opposed tines 420*a*, 420*b* are preferably linear extending parallel to the minor axis B-B with the angularly adjacent tines 420*c*, 420*d* having arcuate peripheral edges with center of curvatures on the deflector central axis C-C. The remaining tine formations 420*e*, 420*f* of the preferred deflector member 402 include a peripheral edge having a linear portion and arcuate portion with the linear portion preferably extending parallel to the major axis A-A and the arcuate portion having a center of curvature centered along the central axis C-C.

The preferred pendent deflection member 402 includes at least three types of slots 418*a*, 418*b*, 418*c*. Formed about each of the first and second opposed tines 420*a*, 420*b* are slots of the first type 418*a* which broaden in the radial inward direction to terminate at a radiused innermost portion to define the longest slots of the deflection member 402. The first type of slots 418*a* preferably extend in a direction that is off center with respect to the central axis C-C. Two diametrically opposed slots of a second type 418*b* are aligned along the minor axis B-B. The second type of slots 418*b* narrowly taper in the radially inward direction toward the deflector central axis C-C to terminate at a radiused inner most portion to define the shortest slot length of the deflector 402. Angularly and preferably centered between the major and minor axes A-A, B-B are slots of a third type 418*c* which are preferably of a constant width along its slot length from the slot opening to its radial innermost portion. The radial innermost portion of each of the second and third slots types 418*b*, 418*c* have their center of curvature preferably at the center axis C-C so as to present a convex surface to the slot openings of the slots 418*b*, 418*c* at the periphery of the deflection member 402.

Figure 6:
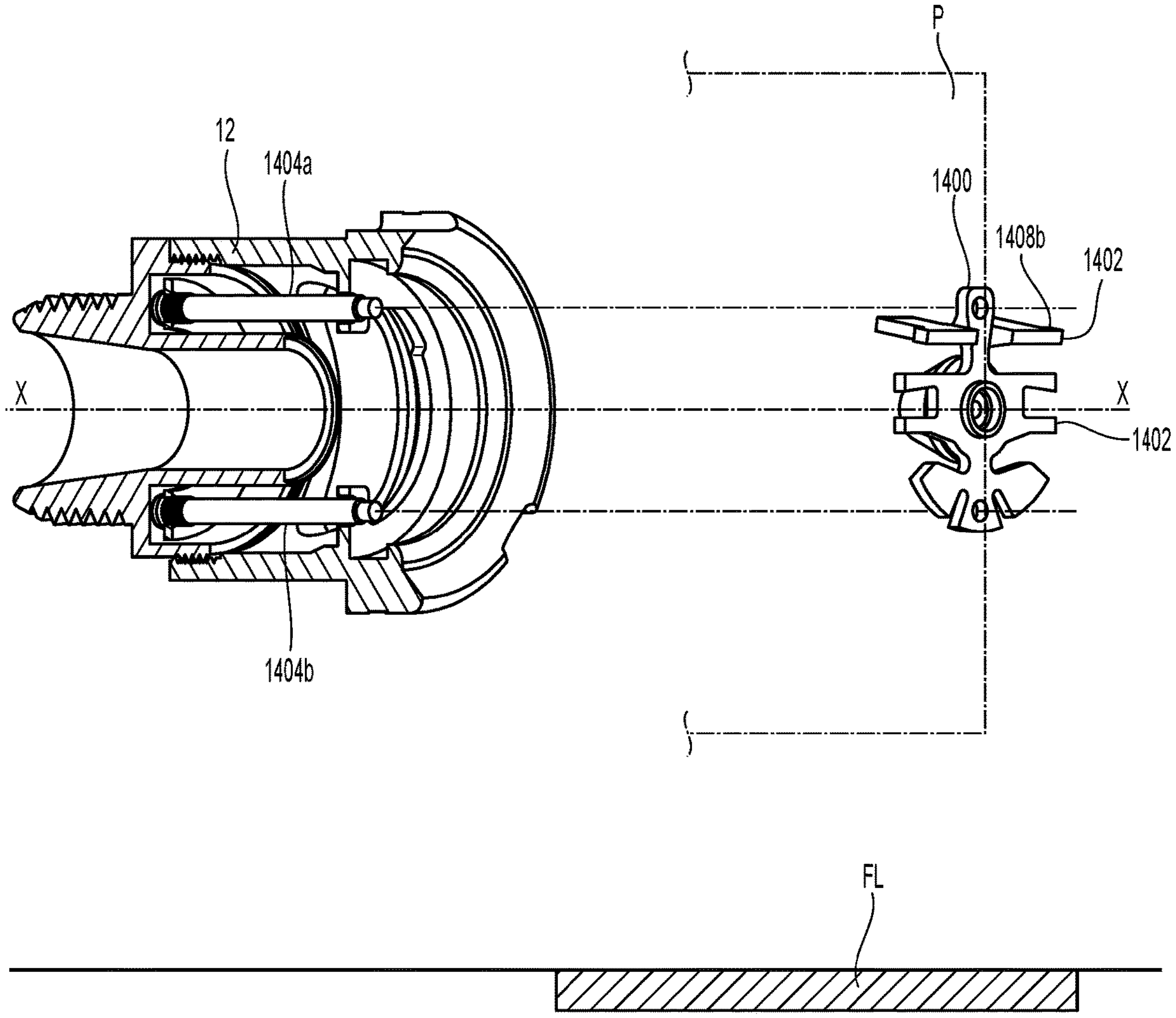
FIG. 6 is a schematic exploded cross-sectional view of a preferred embodiment of a horizontal institutional sprinkler that can be used in the protected institutional sprinkler of FIG. 1.

As seen in FIG. 6, the sprinkler 10 can also be configured for horizontal sidewall installation and operation, in which the sprinkler is oriented with its axis X-X parallel to the ground or floor plane FL of an area to be protected. In a preferred flush mounting of the installation sprinkler, the body of the sprinkler is preferably located interiorly of the exterior or visible wall surface. Moreover, the sprinkler 10 is installed with its deflector assembly 1400 oriented such that the pin members 1404*a*, 1404*b* are disposed in a plane P perpendicular to the floor plane FL. Accordingly, in a preferred horizontal installation, the pin members 1404*a*, 1404*b* are oriented to provide an upper pin member 1404*a* that is above a lower pin member 1404*b* with respect to the floor plane FL.

Shown in FIGS. 6 and 7A-7C is a preferred horizontal deflector assembly 1400 for sidewall installation in which the deflection member 1402 is preferably symmetrically bisected with respect to the pair of pin member 1404*a*, 1404*b* and the plane P. The deflection member 1402 includes a first portion 1402*a* that is preferably disposed generally orthogonal to the sprinkler axis X-X and a second portion 1402*b* that is preferably angled with respect to the first portion 1402*a*. The second portion 1402*b* of the deflection member 1402 preferably provides a planar canopy portion to the deflector assembly 1400 to redirect fluid discharged from the discharge orifice 34 downward toward the deflector axis X-X and rearward back towards the housing 12. Preferably, the second canopy portion 1402*b* includes a portion that extends distally or forward of the first portion 1402*a* with the remainder extending proximally or rearward of the first portion 1402*a*. More preferably, the second canopy portion 1402*b* includes two planar members 1408*a*, 1408*b* disposed about the upper pin member 1404*a* and plane P. Each of the planar members 1408*a*, 1408*b* define a preferred included angle β with respect to the first portion 1402*a* that preferably ranges from 90°-115° degrees.

To facilitate proper installation and orientation of the deflector assembly 1400 with respect to the floor plane FL, reference is made again to FIG. 2B and the previously described uniquely dimensioned and/or located keyways 150. The protective cap 100 can include an orientation indicator such that when the protective cap 100 is properly engaged and oriented about the housing 12, the orientation indicator indicates the top or upper pin location thereby facilitating the proper installation orientation of the horizontal sprinkler 10 and its deflection member 1402 relative to the floor plane P. Moreover, the uniquely dimensioned keyways 150 can orient the installation tool 200 having a corresponding orientation indicator to ensure that the sprinkler 10 is installed in its proper orientation with respect to the floor plane FL.

Figure 7A:
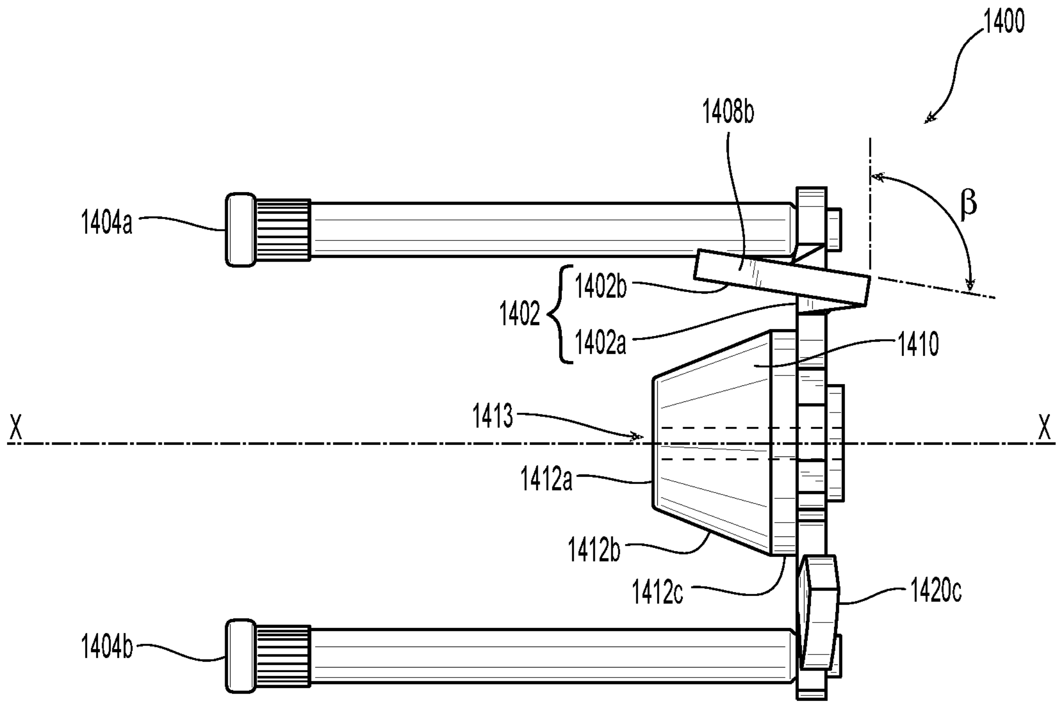
FIGS. 7A-7C are respective side and opposed end views of a preferred horizontal fluid deflector assembly for use in the horizontal institutional sprinkler of FIG. 6.
Figure 7B:
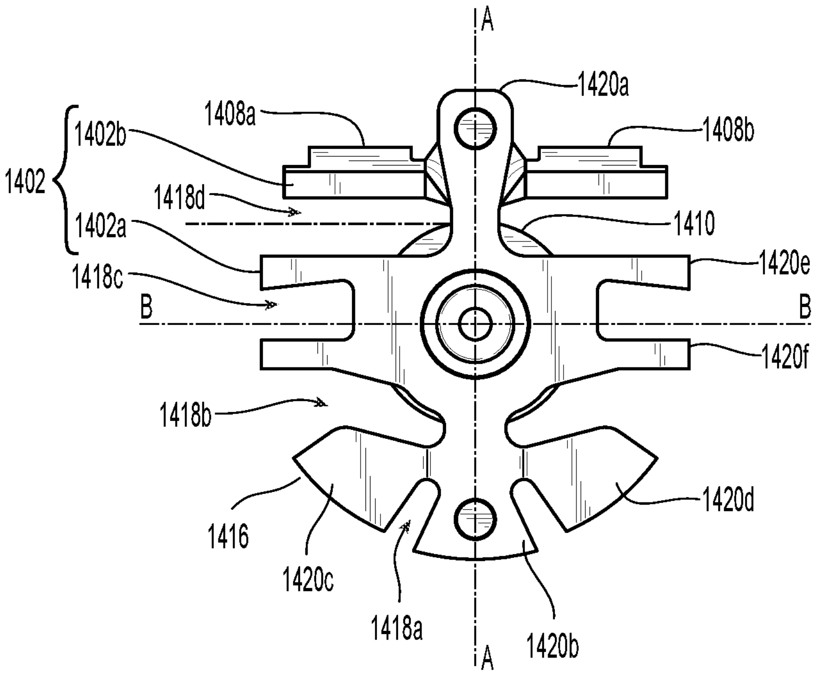

With reference to FIG. 7B, the deflection member 1402 is preferably oblong and symmetrical with respect to the major axis A-A aligned in the plane P. The minor axis B-B extends perpendicular to the plane P. The plurality of spaced apart peripheral edges 1416 of the first portion 1402*a* and the second portion 1402*b* define the various slots 1418 of the preferred deflection member 1402. There are preferably at least four type of slot formations 1418. A first slot type 1418*a* tapers narrowly toward its innermost radial portion, which is preferably radiused. The first type of 1418*a* preferably tapers at a constant rate with respect to a bisecting slot axis that preferably does not intersect the geometric center of the first portion 1402*a* of the deflection member 1402. The first type of slot 1418*a* extends along its slot axis in a radial inward direction that is preferably off-center from the geometric center of the first portion to preferably define the shortest slot length of the various slot length formations. The first type of slots 1418*a* preferably form a pair located angularly adjacent about the bottom pin member 1404*b*.

The longest slot formations define slots of a second type 1418*b* preferably disposed angularly adjacent the slots of the first type 1418*b*. The second type of slot preferably initially extend toward the geometric center of the first portion 1402*a* of the deflection member 1402 and then diverge away from the geometric center. The slots of the second type 1418*b* are preferably asymmetric about its slot axis which bisects the slot opening at the peripheral edge, bisects the radial innermost portion of the slot which is preferably radiused, and extends from the slot opening to the radial innermost portion.

Preferably extending along the minor axis B-B of the first deflector portion 1402*a* are slots of a third type 1418*c*. The slots of the third type 1418*c* is preferably off-set with respect to the minor axis B-B such that the slot axes of the third type of slots 1418*c* are skewed with respect to the minor axis B-B. Each slot of the third type 1418*c* is preferably asymmetric about its slot axis which bisects the slot opening at the peripheral edge, bisects the radial innermost portion of the slot which is preferably linear, and extends from the slot opening to the radial innermost portion. Preferably in each third type slot 1418*c* is defined by the sidewalls disposed about the slot axis in which one sidewall extends generally parallel to the slot axis and the other sidewall extends generally parallel to the minor axis B-B.

A fourth type of slot 1418*d* is preferably formed between the first portion 1402*a* and the second portion 1402*b*. Each slot of the fourth type 1418*d* is preferably asymmetric about its slot axis which bisects the slot opening at the peripheral edge, bisects the radial innermost portion of the slot and extends from the slot opening to the radial innermost portion. Preferably in each fourth type slot 1418*d* is defined by sidewalls disposed about its slot axis in which one sidewall is defined by the first portion 1402*a* of the deflection member 1402 and the other sidewall is defined by second portion 1402*b* with one sidewall being greater in its axial length than the other. In one preferred aspect, the first portion 1402*a* is formed to define the width of the fourth-type slots 1418*d*. More preferably, the first portion 1402*a* of the deflector member is formed to locate the one sidewall of the fourth-type slots 1418*d* with respect to the minor axis B-B to define the slot width of the fourth-type slots, the flow of firefighting fluid therethrough and the distribution of fluid from the fluid deflection member 1402 overall.

The spaced apart peripheral edges 1416 together with the varying slot sidewalls define tines 1420 of the preferred sidewall fluid deflection member 1402. Given the asymmetry of the preferred deflection member 1402, the pin members 1404*a*, 1404*b* are preferably respectively affixed to dissimilar upper tine 1420*a* and lower tine 1420*b* diametrically opposed from one another about the geometric center of the first portion 1402*a* of the deflection member 1402. Two radially tines 1420*c*, 1420*d* angularly disposed about the lower tine 1420*b* are each preferably disposed out of plane with respect to the lower tine 1420*b*. In the view of FIGS. 7A and 7B, the tines 1420*c*, 1420*d* are preferably concave formations having a center of radius of curvature distal of the deflection member 1402. The tine formations 1420*e*, 1420*f* formed about each of the third type of slots 1418*c* preferably include a linear peripheral edge that extends parallel to the plane P.

Figure 7C:
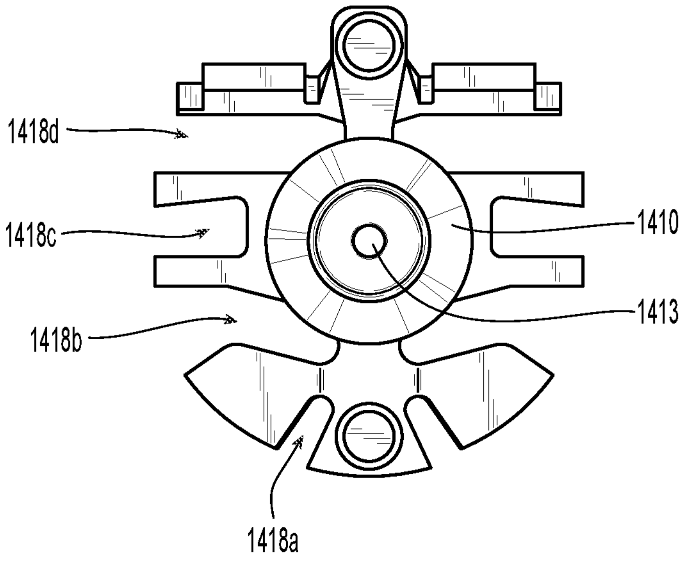

Shown in FIG. 7C is a view of the deflector assembly 1400, opposite that of FIG. 7B, that confronts the discharge orifice 34 of the preferred horizontal sprinkler assembly. Affixed to the impact surface of the deflection member 1402 is the central button 1410. The button 1410 preferably overlaps one or more of the slot formations 1418 and more preferably overlaps each of the slots of the second type 1418*b* and the fourth type 1418*d*. With reference to FIG. 7A, the button 1410 includes a proximal face 1412*a* that can be generally orthogonal to the axis X and a generally conically shaped sidewall portion 1412*b* extending from the proximal face 1412*a*. A generally cylindrical sidewall portion 1412*c* extends from the conically shaped sidewall portion 1412*b*. With reference to FIGS. 7A and 7C, an aperture 1413 preferably extends all the way through the button 1410 from the proximal face 1412 through to the distal end of the button 1410 through which fluid discharged from the orifice 34 can flow. The aperture 1413 is generally preferably aligned with the axis X-X of the sprinkler 10. Alternatively, the aperture 1413 can be angled to direct the flow of fluid skewed at an angle relative to the axis X, as desired. The aperture 1413 can be of a constant diameter or alternately of a variable diameter, for example, tapering along its length. Although a single aperture is shown, multiple apertures can be formed to provide multiple flow paths through the button 1410.

Although the previously described preferred embodiments of sprinkler assemblies are directed to institutional sprinklers, one of ordinary skill in the art would understand that the sprinklers can be modified to include an appropriate thermally responsive actuator to provide a concealed sprinkler, which is a sprinkler in which all or part of the body, other than the shank thread, is mounted within a recessed housing and a cover plate. While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. An automatic institutional sprinkler having an actuated state and an unactuated state, the sprinkler comprising:

an elongate housing having an inlet end surface, a terminal end surface, and an internal surface defining an internal conduit extending along a sprinkler axis between the inlet end surface and the terminal end surface, and a discharge orifice between the inlet end surface and the terminal end surface centered along the sprinkler axis, the internal surface of the housing defining an internal chamber formed along the internal conduit and axially located between the discharge orifice and the terminal end surface, the internal surface of the housing including a first flange and a second flange spaced apart from one another to define the internal chamber;

a deflector assembly including a fluid deflection member, the deflector assembly locating the fluid deflection member in the internal chamber in the unactuated state of the sprinkler and locating the fluid deflection member outside of the internal conduit in the actuated state of the sprinkler;

a seal assembly supported within the discharge orifice by the deflector assembly in the unactuated state of the sprinkler; and a single thermally responsive actuator to control the unactuated and actuated state of the sprinkler, the thermally responsive actuator including a shielding trigger having an insertion end, a thermal detection end and an annular wall extending axially between the insertion and thermal detection ends, the insertion end of the shielding trigger in the unactuated state of the sprinkler being inserted into the internal conduit so that the thermal detection end of the shielding trigger is proximate the terminal end surface of the housing with the annular wall of the shielding trigger located within the internal conduit;

wherein the thermal detection end of the shielding trigger is located within the internal conduit so as to be axially located between the internal chamber of the internal conduit and the terminal end surface of the housing, wherein the internal surface of the housing radially surrounds the shielding trigger to define an annular buffering air gap between the shielding trigger and the internal surface of the housing, wherein the second flange radially surrounds a first portion of the insertion end of the shielding trigger to define a minimum width of the annular buffering gap, wherein the internal surface tapers away from the second flange to the terminal end surface of the housing and surrounds a second portion of the insertion end and the thermal detection end of the shielding trigger, and wherein, in the unactuated state of the automatic institutional sprinkler, the annular buffering air gap provides fluid communication between an environment external to the automatic institutional sprinkler and the internal chamber of the housing.

2. The sprinkler of claim 1, wherein the annular buffering gap having a depth and a width, the depth of the annular buffering gap defined by an axial distance between the insertion end of the shielding trigger and the terminal end surface of the housing, the width of the annular buffering gap defined by a radial distance between the shielding trigger and the inner surface of the housing, the width varying over at least a portion of the annular buffering gap.

3. The sprinkler of claim 2, wherein a ratio of depth-to-maximum width of the annular buffering gap ranges from 0.8:1 to 4:1.

4. The sprinkler of claim 1, wherein the shielding trigger includes a plurality of members held together by a fusible solder, the single thermally responsive actuator further including a first lever member and a second lever member each having a first end and a second end, the first ends of the first and second lever members being in contact with the second flange diametrically opposed from one another about the internal conduit, the second ends of the first and second lever members support and locate the thermal detection end of the shielding trigger within the internal conduit in the unactuated state of the sprinkler.

5. The sprinkler of claim 4, wherein the single thermally responsive actuator further includes a lever bar supported across the first and second lever members and a load screw in threaded engagement with the lever bar to generate a sealing force, the load screw in contact with the deflector assembly to transfer the sealing force to the seal assembly for sealed engagement within the discharge orifice in the unactuated state of the sprinkler.

6. The sprinkler of claim 1, wherein the deflector assembly including a pair of pin members affixed to the fluid deflecting member, the pin members in sliding engagement with the first flange to locate the fluid deflecting member in each of the unactuated and actuated states of the sprinkler.

7. The sprinkler of claim 6, wherein the pin member are diametrically opposed about the discharge orifice disposed in a bisecting plane that symmetrically bisects the fluid deflecting member, the fluid deflection member being a horizontal fluid deflector having a first planar portion disposed perpendicular to the sprinkler axis and the bisecting plane, the horizontal fluid deflector having a second planar portion skewed with respect to the first planar portion and the bisecting plane.

* * * * *